United States Patent
Oommen et al.

(10) Patent No.: US 8,610,318 B2
(45) Date of Patent: Dec. 17, 2013

(54) MOVING MAGNET ACTUATOR MAGNET CARRIER

(75) Inventors: Binu K. Oommen, Milford, MA (US); Richard Tucker Carlmark, Cumberland, RI (US); Joseph A. Stabile, Worcester, MA (US)

(73) Assignee: Bose Corporation, Framingham, MA (US)

( * ) Notice: Subject to any disclaimer, the term of this patent is extended or adjusted under 35 U.S.C. 154(b) by 12 days.

(21) Appl. No.: 13/427,509

(22) Filed: Mar. 22, 2012

(65) Prior Publication Data

US 2012/0248899 A1      Oct. 4, 2012

Related U.S. Application Data

(63) Continuation-in-part of application No. 13/074,195, filed on Mar. 29, 2011.

(51) Int. Cl.
 *H02K 41/02* (2006.01)

(52) U.S. Cl.
 USPC .......................................... 310/12.31; 310/15

(58) Field of Classification Search
 USPC .......... 310/12.17, 12.24–12.27, 12.02, 12.18, 310/12.31, 15
 See application file for complete search history.

(56) References Cited

U.S. PATENT DOCUMENTS

| | | | |
|---|---|---|---|
| 4,968,224 A | 11/1990 | Hashimoto | |
| 4,968,225 A | 11/1990 | Hashimoto et al. | |
| 5,216,723 A * | 6/1993 | Froeschle et al. | 381/418 |
| 5,757,091 A * | 5/1998 | Sogabe et al. | 310/12.02 |
| 5,796,186 A * | 8/1998 | Nanba et al. | 310/14 |
| 6,405,599 B1 | 6/2002 | Patt | |
| 6,930,413 B2 * | 8/2005 | Marzano | 310/12.18 |
| 8,295,537 B2 * | 10/2012 | Carlmark et al. | 381/398 |
| 2002/0125780 A1 * | 9/2002 | Shiratori | 310/156.21 |
| 2011/0069859 A1 * | 3/2011 | Kobayashi et al. | 381/400 |
| 2012/0248899 A1 * | 10/2012 | Oommen et al. | 310/12.26 |

FOREIGN PATENT DOCUMENTS

| | | | | |
|---|---|---|---|---|
| GB | 2388479 A | * | 11/2003 | H02K 1/28 |
| JP | 61106058 A | | 5/1986 | |

OTHER PUBLICATIONS

International Search Report and Written Opinion dated Aug. 29, 2012 for International Application No. PCT/US2012/030342.

* cited by examiner

*Primary Examiner* — Tran Nguyen
(74) *Attorney, Agent, or Firm* — Bose Corporation; Hal Greenberger (57) ABSTRACT

A magnet carrier for a moving magnet actuator. The magnet carrier includes a single longitudinal beam extending in the direction of intended motion of magnet carrier and two pairs of transverse ribs, extending from opposite sides of the longitudinal beam. The longitudinal beam and the two pairs of transverse ribs are arranged to engage a pair of substantially planar magnets. The single longitudinal beam and the two pairs of transverse ribs each comprise a lip for engaging a chamfered edge of a pair of substantially planar magnets so that the lip opposes motion of the magnets in a direction perpendicular to the plane of the magnets. The longitudinal beam and the transverse ribs are adhered to the magnets by an adhesive with an elastic modulus of less than 5 MPa and a tensile strain of greater than 100%.

20 Claims, 7 Drawing Sheets

Fig. 8C ial beam US 8,610,318 B2

MOVING MAGNET ACTUATOR MAGNET CARRIER

CROSS-REFERENCE TO RELATED APPLICATIONS

This application is a continuation-in-part of, and claims priority of, U.S. patent application Ser. No. 13/074,195 entitled "Moving Magnet Actuator Magnet Carrier" filed Mar. 29, 2011 by Carlmark.

BACKGROUND

This specification describes a moving magnet motor and more particularly a magnet carrier for a moving magnet linear actuator.

SUMMARY

In one aspect of the specification, a magnet carrier for a moving magnet motor includes a single longitudinal beam extending in the direction of intended motion of magnet carrier; two pairs of transverse ribs, extending from opposite sides of the longitudinal beam. The longitudinal beam and the two pairs of transverse ribs are arranged to engage a pair of substantially planar magnets. The moving magnet motor is a linear actuator. The magnet carrier may include n>2 pairs of transverse ribs. The longitudinal beam and the n pairs for transverse ribs may be arranged to engage n−1 pairs of magnets. The magnet carrier may be configured to engage the magnets on three sides of the magnets structures and to not engage a fourth side of the magnet structure. The magnet carrier may be a unitary structure. The magnet carrier may be a multi-piece structure. A piece comprising the single longitudinal beam may include a ferrous material. The transverse ribs may be perpendicular to the longitudinal beam.

In another aspect of the specification, an armature for a moving magnet motor includes a magnet carrier. The magnet carrier includes a single longitudinal beam extending in the direction of intended motion of magnet carrier and transverse ribs, extending from the longitudinal beam. The longitudinal beam and the transverse ribs may be arranged to engage a substantially planar magnet on three sides of a quadrilaterally shaped magnet. The transverse ribs may extend from the longitudinal beam in opposite directions. The armature may be configured so that reactive force exerted on the magnet carrier is exerted in line with the single longitudinal beam. The armature magnet carrier may be a unitary structure. The magnet carrier may be a multi-piece structure. A piece comprising the single longitudinal beam may include a ferrous material. The magnet carrier may include n>2 pairs of transverse ribs. The longitudinal beam and the n pairs for transverse ribs may be arranged to engage n−1 pairs of magnets. The transverse ribs may be perpendicular to the longitudinal beam.

In another aspect of the specification, a linear actuator includes an armature for a moving magnet motor. The armature includes a magnet carrier. The magnet carrier includes a single longitudinal beam extending in the direction of intended motion of magnet carrier. The magnet carrier includes transverse ribs, extending from the longitudinal beam. The longitudinal beam and the transverse ribs are arranged to engage a substantially planar magnet structure. The armature is arranged so that reactive forces are applied to the armature in line with the single longitudinal beam.

In another aspect of the specification, a magnet carrier for a moving magnet motor includes a single longitudinal beam extending in the direction of intended motion of the magnet carrier and two pairs of transverse ribs, extending from opposite sides of the longitudinal beam. The longitudinal beam and the two pairs of transverse ribs are arranged to engage a pair of substantially planar magnets. The longitudinal beam and the two pairs of transverse ribs each include a lip for engaging a chamfered edge of the pair of substantially planar magnets so that the lip opposes motion of the pair of substantially planar magnets in a direction perpendicular to the plane of the pair of substantially planar magnet. The magnet carrier further includes an adhesive, bonding the two pairs of transverse ribs and the pair of substantially planar magnets and bonding the longitudinal beam to the pair of substantially planar magnets. The adhesive has an elastic modulus of less than 5 MPa. The magnet carrier may include n>2 pairs of transverse ribs. The longitudinal beam and the n pairs of transverse ribs may be arranged to engage n−1 pairs of magnets. The longitudinal beam and the n>2 pairs of transverse ribs may each include a lip for engaging a chamfered edge of the pair of substantially planar magnets so that the lip opposes motion of the pair of substantially planar magnets in a direction perpendicular to the plane of the pair of substantially planar magnets. The magnet carrier further includes an adhesive, bonding the two pairs of transverse ribs and the n>2 pairs of substantially planar magnets and bonding the longitudinal beam to the n>2 pairs of substantially planar magnets. The adhesive may have an elastic modulus of less than 5 MPa. The nominal elastic modulus of the adhesive may be 3 MPa and the nominal tensile strength of the adhesive may be 200%. The magnet carrier may engage the magnets on three sides of the magnets structures and may not engage a fourth side of the magnet structure. The transverse ribs may be perpendicular to the longitudinal beam. The adhesive may have a tensile strength of 100% or greater.

In another aspect of the specification, an armature for a moving magnet motor includes a magnet carrier including a single longitudinal beam extending in the direction of intended motion of magnet carrier; a substantially planar, quadrilaterally shaped magnet; and transverse ribs, extending from the longitudinal beam. The longitudinal beam and the transverse ribs may be arranged to engage a substantially planar magnet on three sides of the substantially planar quadrilaterally shaped magnet and to not engage the substantially planar magnet on a fourth side. The longitudinal beam and the two pairs of transverse ribs each include a lip for engaging a chamfered edge of substantially planar quadrilaterally shaped magnet so that the lip opposes motion of the substantially planar quadrilaterally shaped magnet in a direction perpendicular to the plane of the substantially planar quadrilaterally shaped magnet. Pairs of transverse ribs may extend from the longitudinal beam in opposite directions. The magnet carrier may include n>2 pairs of transverse ribs. The longitudinal beam and the n pairs for transverse ribs may be arranged to engage n−1 pairs of the substantially planar quadrilaterally shaped magnets. The tansverse ribs may be perpendicular to the longitudinal beam. The armature may further include an adhesive for adhering the substantially planar, quadrilaterally shaped magnet to two of the transverse ribs and to the longitudinal beam. The adhesive may have an elastic modulus of less than 5 MPa and a tensile strength of 100% or more. The a adhesive may have a nominal elastic modulus of 3 MPa and a nominal tensile strength of 200%.

In another aspect, a linear actuator includes an armature for a moving magnet motor. The armature includes a magnet carrier including a single longitudinal beam extending in the direction of intended motion of magnet carrier and transverse ribs, extending from the longitudinal beam. The longitudinal beam and the transverse ribs may be arranged to engage a substantially planar magnet structure. The armature may be arranged so that reactive forces are applied to the armature in line with the single longitudinal beam. The longitudinal beam and the transverse ribs may each include a lip for engaging a chamfered edge of the substantially planar magnet structure so that the lip opposes motion of the substantially planar magnet structure in a direction perpendicular to the plane of the substantially planar magnet structure. The armature further includes an adhesive for bonding the magnet carrier to a magnet. The adhesive has an elastic modulus of less than 5 MPa and a tensile strength of 100% or greater. The adhesive may have a nominal elastic modulus of 3 MPa and a nominal tensile strength of 200%.

In another aspect, an armature for a linear motor includes a first planar, rectangularly shaped magnet structure. Three sides of the magnet structure are characterized by an outer perimeter. The armature further includes a magnet carrier comprising three members engaging the first planar, rectangularly shaped magnet structure on the three sides, and not engaging the first magnet structure on a fourth side of the magnet structure. The three members are characterized by an inner perimeter that is less than the outer perimeter of the magnet structure. The armature further includes an adhesive, bonding the magnet structure to the three members. The adhesive has an elastic modulus of less than 5 MPa and a tensile strain of 100% or greater. The adhesive may have a nominal elastic modulus of 3 MPa or smaller and a nominal tensile strain of 200% or greater. Each of the three members may include an upper lip and a lower lip defining the inner perimeter of the carrier members. The upper lip and the lower lip engage the beveled edge of the magnet structure. One of the members may be a longitudinal beam, extending in the direction of intended motion of the armature, and two of the members may be first and second transverse beams, each with one end connected to the longitudinal beam and the other end unattached. One of the three sides of the rectangularly shaped magnet that are engaged by the three members may have beveled edges. The rectangularly shaped magnet structure may be characterized by a thickness and the three members may be characterized by a thickness that is substantially equal to the magnet structure thickness.

Other features, objects, and advantages will become apparent from the following detailed description, when read in connection with the following drawing, in which:

DETAILED DESCRIPTION

Figures 1, 2A, 2B, 2C:
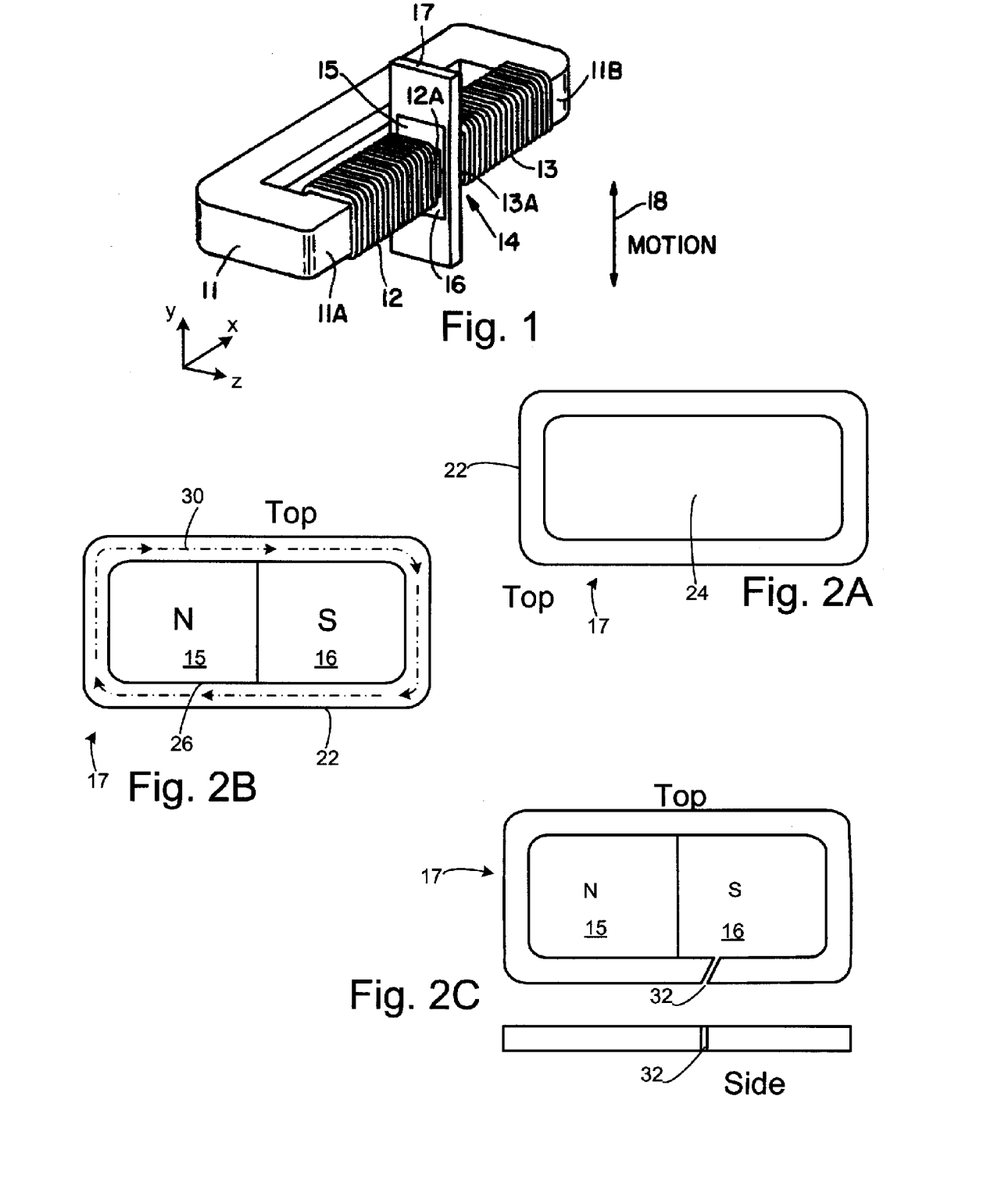
FIG. 1 is a simplified isometric view of a moving magnet linear actuator.
FIGS. 2A-2C are simplified top views and a simplified side view of a magnet carrier.

FIG. 1 shows a simplified isometric view of a moving magnet linear actuator. A first winding 12 and a second winding 13 are wound around legs 11A and 11B of a C-shaped core 11 of material of low magnetic reluctance, such as soft iron. Permanent magnets 15 and 16 seated in movable magnet carrier 17 are positioned in air gap 14 in the C-shaped core, preferably filling a much of the air gap as possible, without contacting the C-shaped core. Permanent magnets 15 and 16 have adjacent unlike poles, the boundary between the poles being located midway along the direction of relative motion 18, between opposed surfaces of core 11, when the current through windings 12 and 13 is substantially zero and with no other external force applied. The movable magnet carrier 17 and the permanent magnets 15 and 16 are components of the armature of the linear actuator; other components of the armature are not shown in this figure. The movable magnet carrier is supported by a suspension, not shown, that permits motion in the direction indicated by arrow 18 while opposing lateral (that is, X-direction according to the coordinate system of FIG. 1) "crashing" forces that urge the magnets toward the opposing faces of the C-shaped core. A suitable suspension is described in U.S. Pat. No. 6,405,599.

In operation, an alternating current signal, for example an audio signal, in the windings 12 and 13 interacts with the magnetic field of the permanent magnets 15 and 16, which causes motion of the armature in the direction indicated by arrow 18.

FIG. 2A shows a simplified view of the magnet carrier 17. A typical configuration for a magnet carrier is a frame 22 and window 24 configuration.

As shown in FIG. 2B, the frame 22 engages the magnet structure 26, which includes permanent magnets 15 and 16 of opposite polarity, on all four sides of the magnet structure 26. The magnet structure may be held in place mechanically by an adhesive, such as an epoxy, or by an interference fit with or without adhesive to supplement the interference fit. The magnet carrier may have structure (not shown) to couple the armature to surrounding structure so that the mechanical energy (motion and force) generated by operation of the linear actuator can be usefully employed.

Desirable characteristics for a material for a magnet carrier include low density, high elastic stiffness and strength, temperature stability, dimensional stability, low cost, and ease of forming (for example, extruding, machining and the like). Thermal conductivity is also desirable for thermal dissipation, particularly if the magnet includes an alloy including a rare earth material such as neodymium. Permanent magnet alloys containing rare earth metals lose magnetization at high temperatures. Metals are a class of material with these characteristics in quantities suitable for a magnet carrier in a linear actuator, with aluminum representing a good choice. Unfortunately, aluminum is also highly electrically conductive. The high conductivity combined with the window structure provides a closed electrical path, indicated by arrows such as arrow 30. The closed electrical path provides a path for the generation of eddy currents when an alternating magnetic field is generated by the coils of the actuator. The eddy currents result in ohmic heating which may result in loss of efficiency of the actuator, thermal damage to the actuator and to nearby components, and, as mentioned above, may cause rare earth magnets to demagnetize.

Other metal materials that have more resistivity, such as titanium, are expensive and may be difficult to form. Electrically non-conductive materials, such as polymers may not be dimensionally stable with time and temperature and may have undesirable thermally insulating properties.

One way of eliminating the closed electrical path is to place a small cut or break 32 in the magnet carrier frame, as shown in FIG. 2C. For purpose of illustration, the small cut or break 32 is shown greatly exaggerated. In an actual implementation, the cut may be as narrow as 0.2 mm. The cut or break may be filled with a non-conductive material such as a structural adhesive, for example epoxy. While the small cut or break eliminates the closed electrical path, it also compromises the structural integrity of the magnet carrier frame.

Figure 3A:
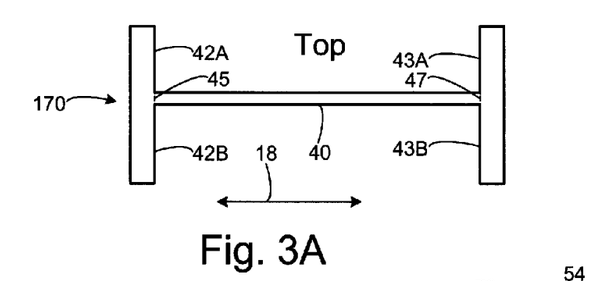
FIGS. 3A-3C are top views of a magnet carriers.
Figure 3B:
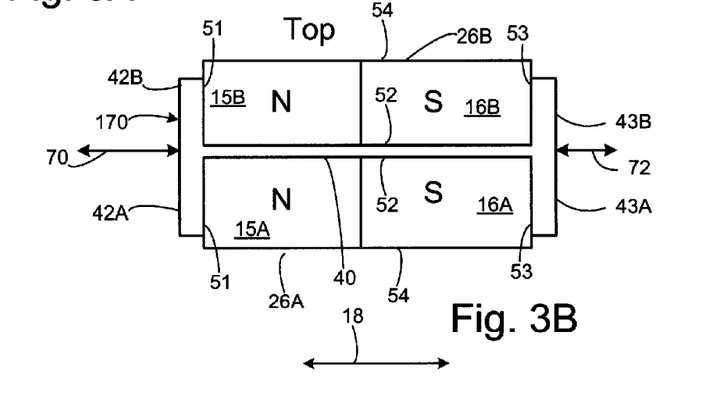

FIGS. 3A and 3B show a magnet carrier configuration that does not have a closed electrical path, but has high structural integrity. FIG. 3A shows the magnet carrier 170 without magnets 15A, 15B, 16A, and 16B in place, and FIG. 3B shows the magnet carrier 170 with magnets 15A, 15B, 16A, and 16B in place. The magnet carrier 170 has a single longitudinal beam 40 extending in the intended direction of motion of the armature indicated by arrow 18. Transverse ribs 42A and 42B extend from opposite sides of the single longitudinal beam in opposite directions, which may be perpendicular to the beam. Transverse ribs 42A and 42B may form a single line. Likewise, transverse ribs 43A and 43B extend from opposite sides of the single longitudinal beam in opposite directions, which may be perpendicular to the beam. Transverse ribs 43A and 43B may form a single line. Transverse ribs 42A and 42B and 43A and 43B lie in the same plane, and engage a pair of magnets 26A (including magnets 15A and 16A) and 26B (including magnets 15B and 16B) on three edges, 51, 52, and 53 of the magnetic structures 26A and 26B. The fourth edge 54 may be unconstrained. The magnet carrier 170 may be a unitary structure as shown, or may be non-unitary. For example, a three piece implementation could include three pieces, divided at dashed lines 45 and 47. One piece could include transverse ribs 42A and 42B; a second piece could include transverse ribs 43A and 43B; and a third piece could include the longitudinal beam 40. The third piece including the longitudinal beam could be made of a ferrous material to permit more magnetic material to be positioned in the air gap.

The magnet carrier may be coupled to other components of the motor so that the reactive force is applied in the direction indicated by arrows 70 and 72, which is in line with the longitudinal beam.

Figure 3C:
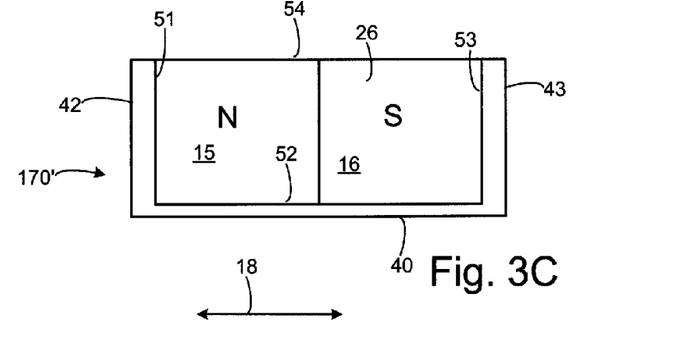

FIG. 3C shows another implementation 170' of the magnet carrier of FIGS. 3A and 3B. In the implementation of FIG. 3C, the transverse ribs extend from longitudinal beam 40 on only one direction, and there is only one magnet structure 26 which includes two magnets 15 and 16. Other reference numbers refer to like numbered elements in FIGS. 3A and 3B. The implementation of FIG. 3A requires only one magnet structure 26, and can be implemented so that little or no non-magnetic structure is in the air gap, but has mechanical disadvantages compared to the implementation of FIGS. 3A and 3B.

Figure 4:
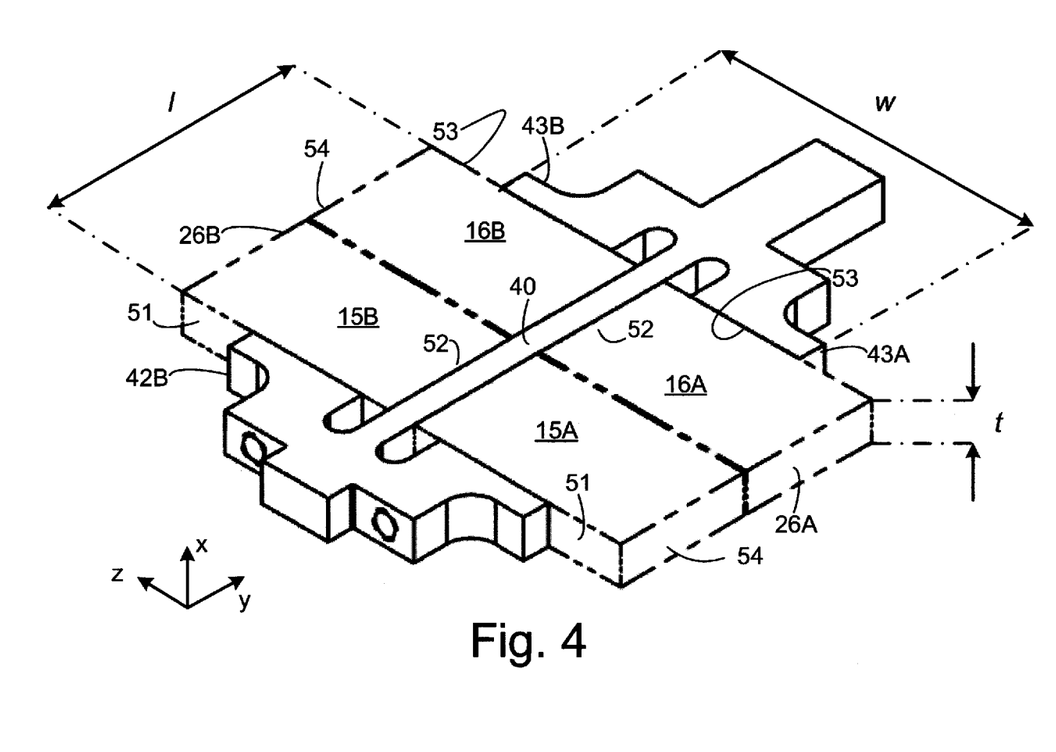
FIG. 4 is an isometric view of a magnet carrier.

FIG. 4 shows an actual implementation of a magnet carrier according to FIGS. 3A and 3B. Reference numbers in FIG. 4 refer to corresponding elements with like reference numbers in FIGS. 3A and 3B. In the implementation of FIG. 4, the magnet carrier is made of aluminum, with a thickness t of 4.5 mm. The transverse ribs 43A and 43B have a width w of 36 mm. The magnet carrier is designed to accommodate magnets 26A and 26B of thickness 4.5 mm (in this example the same as the thickness, but in other examples, could be smaller), and a width w of 50 mm. In this implementation, the magnet is formed of a neodymium-iron-boron alloy.

Figure 5:
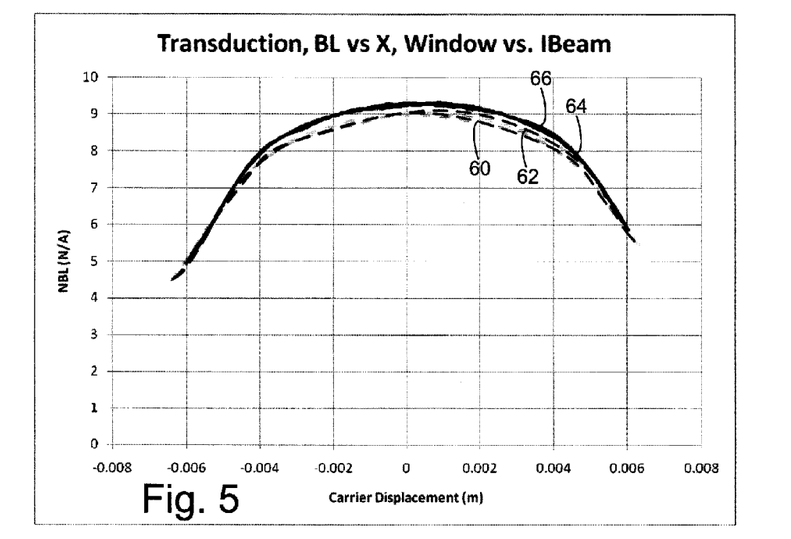
FIG. 5 is a plot of force produce per input current vs. displacement.

The magnet carrier configuration of FIGS. 3A, 3B, and 4 is advantageous over the magnet carrier configuration of FIG. 2. Magnet carriers according to FIGS. 3A and 3B can be inexpensively formed by forming an extrusion in the X-direction, and separating individual magnet carriers, for example by sawing in the Y-Z plane. There is no need to form the window of the configuration of FIG. 2, for example, by cutting. Since the magnet structure is not constrained in the Z-direction, less precision is required in the Z-dimension. Mismatch of thermal expansion/contraction between the magnet and the magnet carrier is detrimental only in the Y-direction, but not in the X-direction or the Z-direction. In a magnet carrier configuration according to FIGS. 3A, 3B, and 4, the non-magnetic beam 40 lies in the air gap of the C-shaped core 11. Non-magnetic material in the air gap may negatively affect transduction because less magnetic material is in the air gap. However, as shown in FIG. 5, the transduction coefficient (that is, the force produced per input current) of a linear actuator using a magnet carrier according to FIGS. 3 and 4 (represented by lines 60 and 62) is only about 2-3% less than a linear actuator using a conventional magnet carrier as in FIGS. 2A-2C (represented by lines 64 and 66).

Figure 6:
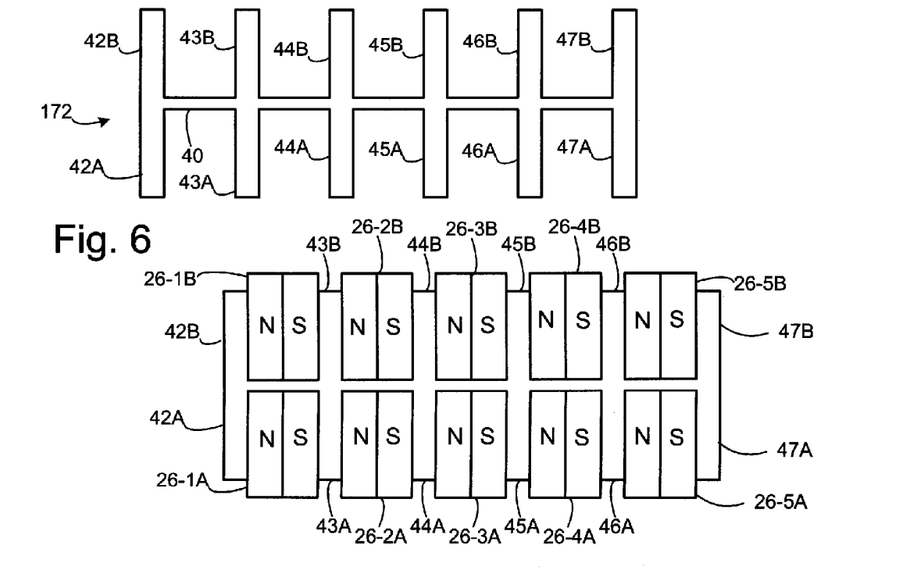
FIG. 6 is a top view of a magnet carrier and a top view of a magnet carrier with magnets.

FIG. 6 shows an implementation of a magnet carrier 172 according to FIG. 3, for a multiple magnet linear actuator. The implementation of FIG. 6, there are n (in this example 6) pairs of transverse ribs 42A and 42B, 43A and 43B, 44A and 44B, 45A and 45B, 46A and 46B, and 47A and 47B which accommodate n−1 (in this example 5) pairs of magnetic structures 26-1A and 26-1B, 26-2A and 26-2B, 26-3A and 26-3B, 26-4A and 26-4B, and 26-5A and 26-5B.

Figure 7A:
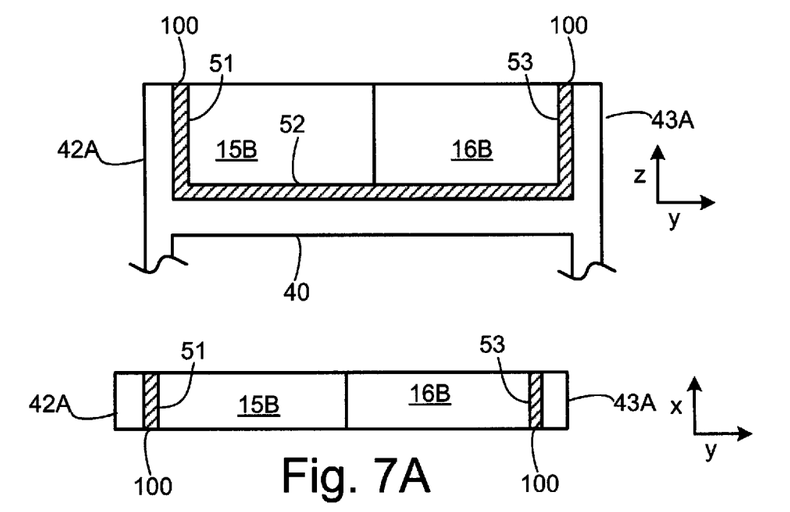
FIG. 7A is a diagrammatic top view of a magnet and a portion of a magnet carrier.
Figure 7B:
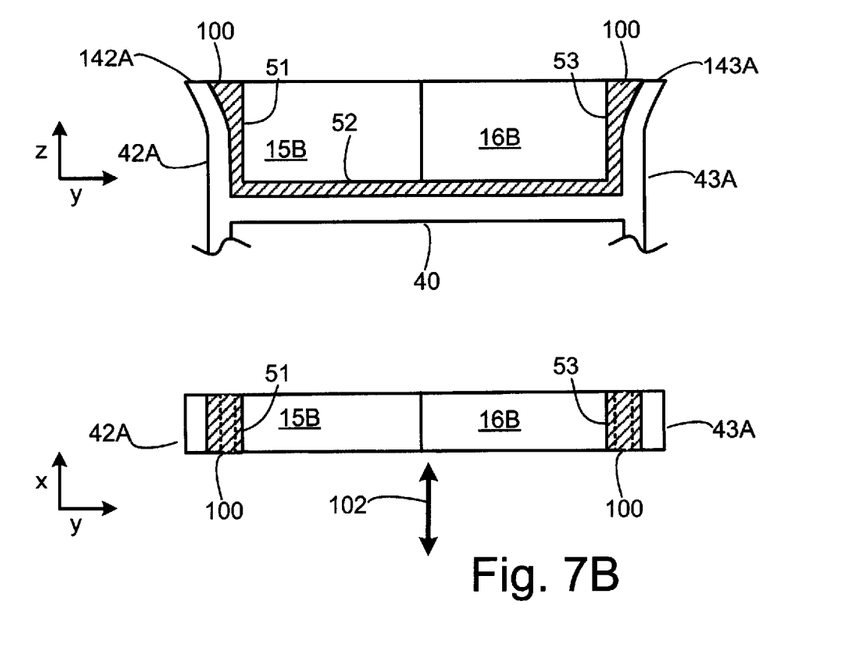
FIG. 7B is a diagrammatic top view of a magnet and a portion of a magnet carrier, illustrating the effects of thermal cycling.

As stated above, an advantage of the magnet carrier configuration of FIGS. 3A, 3B, and 3C is that the mismatch of thermal expansion/contraction between the magnet and the magnet carrier is generally not detrimental in the X-direction or the Z-direction. In some cases, thermal mismatch between the magnet carrier, the magnet (and in some cases the adhesive) may be problematic in the Y-direction. FIGS. 7A and 7B illustrate one case. FIGS. 7A and 7B include some of the elements of FIGS. 3A-3C. Like numbered elements refer to similar elements in FIGS. 3A-3C. In FIGS. 7A and 7B and all implementations, magnets 15A and 16A and magnets 15B and 16B may be implemented on a single piece of magnetic material. "Magnet structure" as used herein can consist of one or more physical pieces of magnetic material. In addition, FIGS. 7A and 7B show adhesive 100, which bonds the magnet to the magnet structure. Thermal expansion/contraction mismatch between the magnet, the magnet carrier, and the adhesive may result in stresses that deform one or more of the components and may compromise the construction. For example, in FIG. 7B, the unconstrained end 142A of transverse rib 42A and the unconstrained end 143A of transverse rib 43A may be deformed outwardly, as shown in FIG. 7B, and the deformation may be permanent. The adhesive 100 may be stretched, which may result in fractures in the adhesive and the fractures may compromise the joint between the magnet and the magnet carrier. FIG. 7B is for discussion of the deformation only. In an actual implementation, the magnet, the magnet carrier, and the adhesive may deform in much more complex ways than as shown in FIG. 7B. Additionally, for purpose of illustration, some dimensions, for example the thickness of the adhesive 100 are greatly exaggerated.

One technique that can alleviate some effects of the thermal mismatch problem is to use an adhesive with a low elastic modulus, for example less than 5 MPa and preferably with a tensile strain of 100% or greater. The use of an adhesive with a low elastic modulus and a high tensile strain makes the formation of fractures in the adhesive less likely so that some deformation of the magnet carrier or the magnet can be tolerated without compromising the joint between the magnet and the magnet carrier.

Figure 8A:
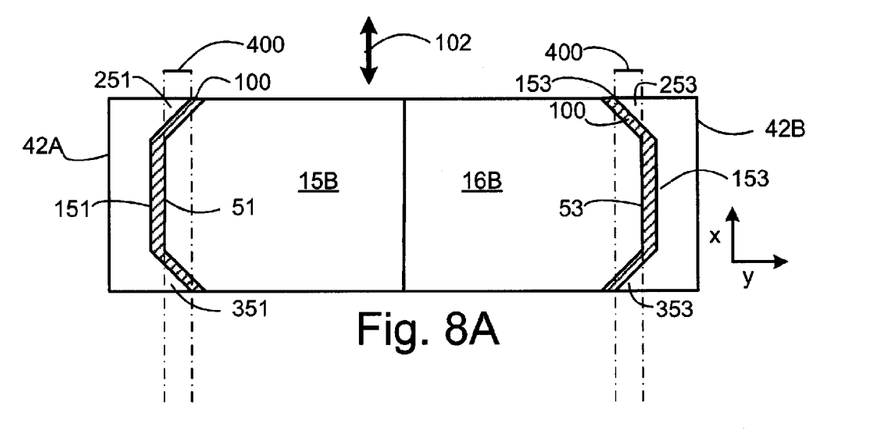
FIGS. 8A and 8B are diagrammatic cross-sections of a magnet carrier with lips to engage chamfered edges of a magnet.
Figure 8B:
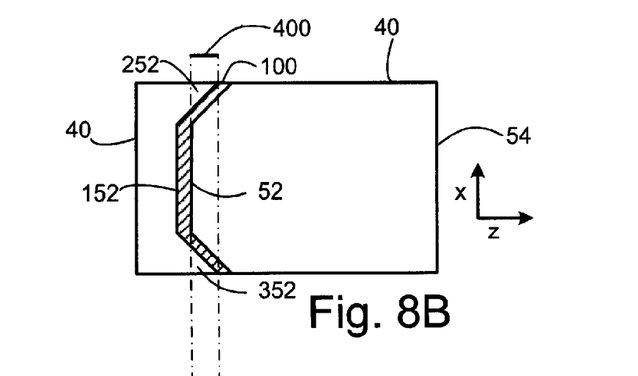
Figure 8C:
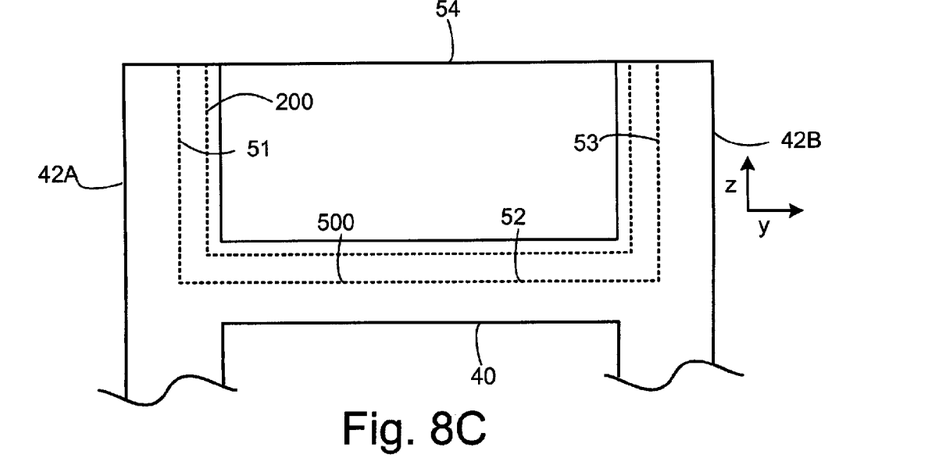
FIG. 8C is a diagrammatic top view of a magnet and a portion of a magnet carrier.

However, adhesives with a low elastic modulus may be have inadequate shear resistance to crashing forces, mentioned above and indicated in FIG. 7B by arrow 102. FIGS. 8A, 8B, and 8C show, respectively, a side cross sectional view of transverse ribs 42A and 43B and magnet structure 15B and 16B; a side view cross sectional view of longitudinal beam 40 and magnet structure 15B or 16B, and a top view of a magnet and magnet carrier assembly. The magnet carrier of FIGS. 8A-8C reduces the negative mechanical effects of thermal mismatch in the Y-direction. In the configuration of FIGS. 8A-8C, the edges of the transverse ribs 42A and 43A and of the longitudinal beam that engage constrained edges 51, 52, and 53 of the magnet have lips 251, 252, 253, and 351, 352, and 353 that extend inwardly in the Y-Z plane so that the inner perimeter 200 formed by the inner edges of lips 251, 252, and 253 and by the inner edges of lips 351, 352, and 353 is less than the outer perimeter 500 of the outer edges 51, 52, and 53 of the magnet. In one implementation, constrained edges 51, 52, and 53 of the magnet are chamfered or beveled and the inside surface of the magnet carrier is correspondingly shaped to engage the beveled edge. Adhesive 100 is applied between the constrained edges 51, 52, and 53 of the magnet and the corresponding inner surface 151, 152, 153 of the magnet carrier that engage the magnet. In one implementation, the adhesive 100 is an adhesive with a low elastic modulus, for example, Q5 8401 silicone adhesive (available from the Dow Corning Corporation, url dowcorning.com) with a nominal elastic modulus of 3 MPa and with a nominal tensile strain of 200%. "Nominal" as used herein refers to the specification as claimed on the specification sheet by the provider. Referring to FIGS. 8A and 8B, the elasticity of the adhesive provides adequate adhesion between the magnet and the magnet carrier despite thermal expansion/contraction mismatches between the magnet and the magnet carrier. The lips 251, 252, and 253 and the lips 351, 352, and 353 result in a mechanical overlap 400 between the magnet carrier and the magnet. If the magnet is urged in the X-direction by crashing forces indicated by arrow 102, compression and/or expansion of the adhesive and engagement between the magnet and lips 251, 252, 253, 352, 353, 353 retains the magnet in the magnet carrier.

Figure 9A:
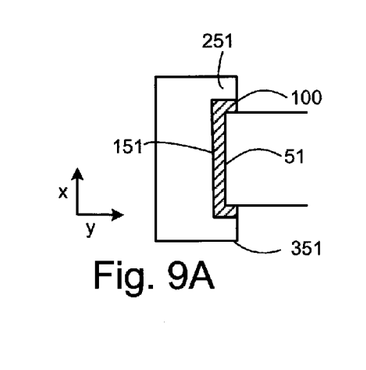
FIGS. 9A-9C are alternative embodiment of the structure of FIGS. 8A-8C.
Figure 9B:
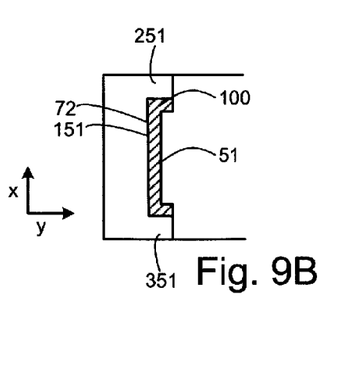
Figure 9C:
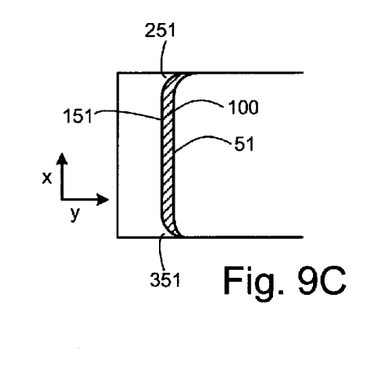

FIGS. 9A-9C show other configurations of a magnet and magnet carrier. In the configuration of FIG. 9A, the magnet is not beveled or chamfered. The configuration of FIG. 9A is less advantageous than the configuration of FIGS. 8A and 8B because the configuration of FIGS. 8A-8C permits the use of a thicker magnet, resulting in more magnetic material in the air gap 14 of FIG. 1.

In the configuration of FIG. 9B, the magnet is not beveled or chamfered, but has a protruding band 72 that overlaps with the lips 251 (and 252, and 253, not seen in this view) and 351 (and 352, and 353, not seen in this view). The configuration of FIG. 9B is less advantageous than the configuration of FIGS. 8A and 8B because, while the configuration of FIG. 9B has more magnetic material than the configuration of FIG. 9A, the configuration of FIG. 9B has less magnetic material than the configuration of FIGS. 8A-8C; the thickness of the magnetic material is substantially equal to the thickness of the transverse ribs and the longitudinal beam. In addition, in the configuration of FIG. 9B, the machining or forming of the magnet is more difficult than in the configuration of FIGS. 8A-8C, and magnetic materials are often difficult to machine and/or form.

In the configuration of FIG. 9C, the magnet is not beveled or chamfered, but rather the edge is rounded. While the configuration of FIG. 8C the thickness of the magnetic material is substantially equal to the thickness of the transverse ribs and the longitudinal beam, and may have slightly more magnetic material than the configuration of FIGS. 8A-8C, there is less overlap between the lips 251 (and 252, and 253, not seen in this view) and 351 (and 352, and 353, not seen in this view) and the magnet, so there is less resistance to crashing forces than with the configuration of FIGS. 8A-8C.

The configuration of FIGS. 8A-8C also offers manufacturing advantages. The magnet and magnet carrier can be assembled by applying force to the unconstrained edge 54 of the magnet in the Z-direction. The lips 251, 252, 253, 351, 352, and 353 maintain proper alignment in the Y-Z plane during and after insertion of the magnet into the magnet assembly.

Figure 10:
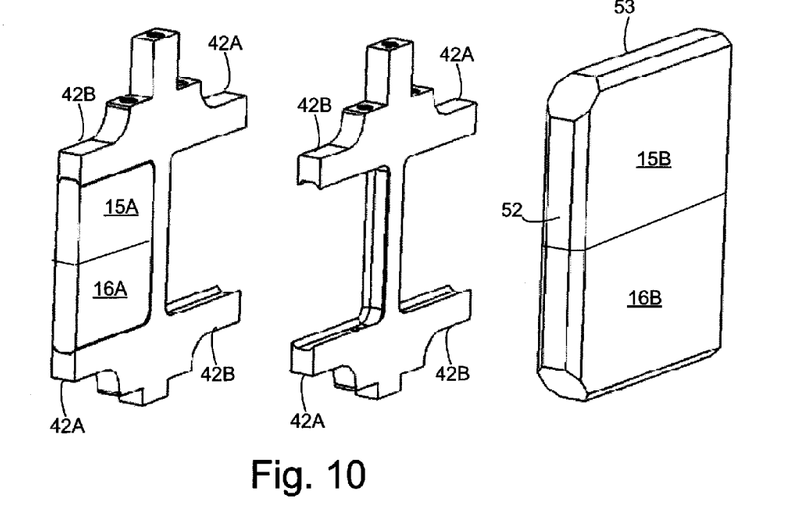
FIG. 10 is three isometric views of a magnet and magnet carrier; of the magnet carrier; and of the magnet.

FIG. 10 shows an isometric view of an assembled magnet and magnet carrier, a magnet carrier, and magnets including 15A and 15B (oriented to show the chamfered edges 52 and 53) according to FIGS. 8A and 8B. Reference numbers refer to like numbered elements in the previous views.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A magnet carrier for a moving magnet motor, comprising:
    a single longitudinal beam extending in the direction of predetermined motion of the magnet carrier;
    two pairs of transverse ribs, extending from opposite sides of the longitudinal beam, wherein the longitudinal beam and the two pairs of transverse ribs are arranged to engage a pair of substantially planar magnets, wherein the longitudinal beam and the two pairs of transverse ribs each comprise a lip for engaging a chamfered edge of the pair of substantially planar magnets so that the lip opposes motion of the pair of substantially planar magnets in a direction perpendicular to the plane of the pair of substantially planar magnets; and
    an adhesive, bonding the two pairs of transverse ribs and the pair of substantially planar magnets and bonding the longitudinal beam to the pair of substantially planar magnets, the adhesive having an elastic modulus of less than 5 MPa.

2. The magnet carrier of claim 1, comprising n>2 pairs of transverse ribs, wherein the longitudinal beam and the n pairs of transverse ribs are arranged to engage n−1 pairs of magnets, wherein n is an integer, wherein the longitudinal beam and the n>2 pairs of transverse ribs each comprise a lip for engaging a chamfered edge of the pair of substantially planar magnets so that the lip opposes motion of the pair of substantially planar magnets in a direction perpendicular to the plane of the pair of substantially planar magnets; and
    an adhesive, bonding the two pairs of transverse ribs and the n>2 pairs of substantially planar magnets and bonding the longitudinal beam to the n>2 pairs of substantially planar magnets, the adhesive having an elastic modulus of less than 5 MPa.

3. The magnet carrier of claim 1, wherein the nominal elastic modulus of the adhesive is 3 MPa and the nominal tensile strain of the adhesive is 200%.

4. The magnet carrier of claim 1, wherein the magnet carrier engages the magnets on three sides of the magnets structures and does not engage a fourth side of the magnet structure.

5. The magnet carrier of claim 1, wherein the transverse ribs are perpendicular to the longitudinal beam.

6. The magnet carrier of claim 1, wherein the adhesive has a tensile strain of 100% or greater.

7. An armature for a moving magnet motor, comprising:
a magnet carrier comprising
a single longitudinal beam extending in the direction of intended predetermined motion of magnet carrier;
a pair of substantially planar, quadrilaterally shaped magnets;
transverse ribs, extending from the longitudinal beam, wherein the longitudinal beam and the transverse ribs are arranged to engage a pair of substantially planar magnet on three sides of the pair of substantially planar quadrilaterally shaped magnet and to not engage the substantially planar magnet on a fourth side;
wherein the longitudinal beam and the two pairs of transverse ribs each comprise a lip for engaging a chamfered edge of the pair of substantially planar pair of quadrilaterally shaped magnets so that the lip opposes motion of the substantially planar pair of quadrilaterally shaped magnets in a direction perpendicular to the plane of the substantially planar pair of quadrilaterally shaped magnets;
the magnet carrier further comprising an adhesive, bonding the two pairs of transverse ribs and the pair of substantially planar magnets and bonding the longitudinal beam to the pair of substantially planar magnets, the adhesive having an elastic modulus of less than 5 MPa.

8. The armature of claim 7, wherein pairs of transverse ribs extend from the longitudinal beam in opposite directions.

9. The armature of claim 7, wherein the magnet carrier comprises n>2 pairs of transverse ribs, wherein n is an integer, wherein the longitudinal beam and the n pairs for transverse ribs are arranged to engage n−1 pairs of the substantially planar quadrilaterally shaped magnets.

10. The armature of claim 7, wherein the transverse ribs are perpendicular to the longitudinal beam.

11. The armature of claim 7, further comprising an adhesive for adhering the substantially planar, pair of quadrilaterally shaped magnets to two of the transverse ribs and to the longitudinal beam, the adhesive having an elastic modulus of less than 5 MPa and a tensile strain of 100% or more.

12. The armature of claim 11, wherein the adhesive has a nominal elastic modulus of 3 MPa and a nominal tensile strain of 200%.

13. A linear actuator, comprising:
an armature for a moving magnet motor, comprising:
a magnet carrier comprising
a single longitudinal beam extending in the direction of predetermined motion of magnet carrier; and
transverse ribs, extending from the longitudinal beam, wherein the longitudinal beam and the transverse ribs are arranged to engage a substantially planar magnet structure;
wherein the armature is arranged so that reactive forces are applied to the armature in line with the single longitudinal beam wherein the longitudinal beam and the transverse ribs each comprise a lip for engaging a chamfered edge of the substantially planar magnet structure so that the lip opposes motion of the substantially planar magnet structure in a direction perpendicular to the plane of the substantially planar magnet structure; the armature further comprising an adhesive for bonding the magnet carrier to a magnet, the adhesive having an elastic modulus of less than 5 MPa and a tensile strain of 100% or greater.

14. The linear actuator of claim 13, wherein the adhesive has a nominal elastic modulus of 3 MPa and a nominal tensile strain of 200%.

15. An armature for a linear motor, comprising:
a first planar, rectangularly shaped magnet structure having, wherein three sides of the structure are characterized by an outer perimeter;
a magnet carrier comprising three members engaging the first planar, rectangularly shaped magnet structure on the three sides, and not engaging the first magnet structure on a fourth side of the magnet structure, the three members characterized by an inner perimeter that is less than the outer perimeter of the magnet structure;
an adhesive, bonding the magnet structure to the three members, the adhesive having an elastic modulus of less than 5 MPa and a tensile strain of 100% or greater.

16. The armature of claim 15, wherein the adhesive has a nominal elastic modulus of 3 MPa or smaller and a nominal tensile strain of 200% or greater.

17. The armature of claim 15, each of the three members comprising an upper lip and a lower lip defining the inner perimeter of the carrier members, the upper lip and the lower lip engaging the beveled edge of the magnet structure.

18. The armature of claim 15, wherein one of the members is a longitudinal beam, extending in the direction of intended motion of the armature, and wherein two of the members are a first and a second transverse beam, each with one end connected to the longitudinal beam and the other end unattached.

19. The armature of claim 15, wherein three sides of the rectangularly shaped magnet that are engaged by the three members have beveled edges.

20. The armature of claim 15, wherein the rectangularly shaped magnet structure is characterized by a thickness and wherein the three members are characterized by a thickness that is substantially equal to the magnet structure thickness.

* * * * *